(12) United States Patent
Kang et al.

(10) Patent No.: US 12,312,735 B2
(45) Date of Patent: May 27, 2025

(54) WASHING MACHINE WITH DRYING FUNCTION

(71) Applicant: SAMSUNG ELECTRONICS CO., LTD., Suwon-si (KR)

(72) Inventors: Heejin Kang, Suwon-si (KR); Bongjin Ko, Suwon-si (KR); Younghyun Kim, Suwon-si (KR); Seulgi Lee, Suwon-si (KR); Jiyu Lee, Suwon-si (KR); Hyounyoung Lee, Suwon-si (KR); Seungil Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 265 days.

(21) Appl. No.: 18/121,329

(22) Filed: Mar. 14, 2023

(65) Prior Publication Data

US 2023/0279607 A1    Sep. 7, 2023

Related U.S. Application Data

(63) Continuation of application No. PCT/KR2023/001446, filed on Feb. 1, 2023.

(30) Foreign Application Priority Data

Mar. 3, 2022 (KR) ........................ 10-2022-0027667

(51) Int. Cl.
*D06F 58/22* (2006.01)
*B01D 46/00* (2022.01)
(Continued)

(52) U.S. Cl.
CPC ......... *D06F 58/22* (2013.01); *B01D 46/0086* (2013.01); *B01D 46/16* (2013.01);
(Continued)

(58) Field of Classification Search
CPC ....................................................... D06F 39/22
See application file for complete search history.

(56) References Cited

U.S. PATENT DOCUMENTS

| | | |
|---|---|---|
| 7,134,221 B2 | 11/2006 | Stein et al. |
| 8,490,437 B2 | 7/2013 | Kawabata et al. |
| (Continued) | | |

FOREIGN PATENT DOCUMENTS

| | | |
|---|---|---|
| JP | 2009-22346 A | 2/2009 |
| JP | 2020-81723 A | 6/2020 |
| (Continued) | | |

OTHER PUBLICATIONS

International Search Report dated May 19, 2023 for International Application No. PCT/KR2023/001446.
(Continued)

*Primary Examiner* — Jason Y Ko
(74) *Attorney, Agent, or Firm* — STAAS & HALSEY LLP

(57) ABSTRACT

A washing machine with drying function may include a cabinet with a laundry insertion hole; a tub having a front opening and a back opening; a drum inside the tub, the laundry insertion hole, front opening, and drum being positioned so that laundry is insertable through the laundry insertion hole; a heated air supplying device with a heat exchange part above the tub, a front and back duct, and a blower fan to form an airflow, via the back and front duct, from the back opening to the heat exchange part, and then to the front opening; a lint filter in the back duct; a sensor to detect lint in the lint filter and produce a corresponding signal; a washing device to spray washing water toward the lint filter; and a processor to control the washing device to spray the washing water based on the signal produced by the sensor.

16 Claims, 10 Drawing Sheets

(51) Int. Cl.
  *B01D 46/16* (2006.01)
  *B01D 46/44* (2006.01)
  *B01D 46/46* (2006.01)
  *B01D 46/69* (2022.01)
  *D06F 25/00* (2006.01)
  *D06F 34/20* (2020.01)
  *D06F 39/00* (2020.01)
  *D06F 39/08* (2006.01)
  *D06F 58/02* (2006.01)
  *D06F 58/20* (2006.01)
  *D06F 103/42* (2020.01)
  *D06F 105/02* (2020.01)
  *D06F 105/34* (2020.01)

(52) U.S. Cl.
  CPC ........... *B01D 46/442* (2013.01); *B01D 46/46* (2013.01); *B01D 46/69* (2022.01); *D06F 25/00* (2013.01); *D06F 34/20* (2020.02); *D06F 39/00* (2013.01); *D06F 39/088* (2013.01); *D06F 58/02* (2013.01); *D06F 58/206* (2013.01); *D06F 2103/42* (2020.02); *D06F 2105/02* (2020.02); *D06F 2105/34* (2020.02)

(56) References Cited

U.S. PATENT DOCUMENTS

| | | |
|---|---|---|
| 9,702,625 B2 | 7/2017 | Kim et al. |
| 10,563,342 B2 | 2/2020 | Moniz et al. |
| 11,028,523 B2 | 6/2021 | Kim et al. |
| 2009/0211309 A1 | 8/2009 | Kawabata et al. |
| 2017/0191208 A1 | 7/2017 | Kim et al. |
| 2018/0126313 A1 | 5/2018 | Canonico et al. |
| 2022/0002929 A1 | 1/2022 | Yong et al. |

FOREIGN PATENT DOCUMENTS

| | | |
|---|---|---|
| KR | 10-0939589 | 2/2010 |
| KR | 10-1073904 | 10/2011 |
| KR | 10-2017-0082057 A | 7/2017 |
| KR | 10-2018-0129610 A | 12/2018 |
| KR | 10-2052970 | 12/2019 |
| KR | 10-2155034 | 9/2020 |
| KR | 10-2022-0004528 A | 1/2022 |

OTHER PUBLICATIONS

Written Opinion of the International Searching Authority dated May 19, 2023 for International Application No. PCT/KR2023/001446.

WASHING MACHINE WITH DRYING FUNCTION

CROSS-REFERENCE TO RELATED APPLICATIONS

This application a continuation application of PCT International Patent Application No. PCT/KR2023/001446, filed on Feb. 1, 2023 which is based on and claims priority under 35 U.S.C. § 119 to Korean Patent Application No. 10-2022-0027667, filed on Mar. 3, 2022 in the Korean Intellectual Property Office, the disclosure of which is incorporated by reference herein in its entirety.

BACKGROUND

1. Field

The disclosure relates to a washing machine with drying function, and more particularly to a washing machine with drying function which can effectively wash a lint filter.

2. Description of the Related Art

In general, washing machines which wash laundry and dryers which dry laundry are formed as separate devices. Accordingly, consumers dry laundry which has completed washing by using a dryer after washing the laundry using a washing machine.

However, in cases where the washing machine and the dryer are formed as separate devices as described above, there is an inconvenience of a user having to wait until the laundry is completed and then move the laundry which has completed washing to the dryer. To solve the inconvenience described above, a washing machine with drying function has been developed and is being used.

When drying the laundry, lint (fine fluff) generated from the laundry is included in air and discharged. A lint filter is disposed in a flow path and lint is prevented from blocking the flow path, but there is a problem of having to effectively wash the lint filter accumulated with lint.

SUMMARY

Aspects of embodiments of the disclosure will be set forth in part in the description which follows and, in part, will be apparent from the description, or may be learned by practice of the presented embodiments.

According to an embodiment of the disclosure, a washing machine with drying function may include a cabinet having a laundry insertion hole at a front surface of the cabinet; a tub inside the cabinet and having a front opening and a back opening; a drum rotatably disposed inside the tub, wherein the laundry insertion hole, the front opening, and the drum are positioned so that laundry is insertable through the laundry insertion hole and then through the front opening to be received in the drum; a heated air supplying device including a heat exchange part above the tub, a front duct, a back duct, and a blower fan to form an airflow that flows, via the back duct and the front duct, from the back opening to the heat exchange part, and then to the front opening; a lint filter inside the back duct, and configured to filter lint in the airflow flowing through the back duct; a sensor fixed to the lint filter and configured to detect lint in the lint filter, and to produce a corresponding signal; a washing device configured to selectively spray washing water toward the lint filter; and a processor configured to control the washing device to spray the washing water toward the lint filter based on the signal produced by the sensor.

According to an embodiment of the disclosure, the sensor is disposed at a lower surface of the lint filter.

According to an embodiment of the disclosure, the sensor includes a first terminal, and a second terminal, wherein the first terminal and the second terminal are spaced apart from each other, and the first terminal and the second terminal are electrically connectable by lint collected in the lint filter.

According to an embodiment of the disclosure, the first terminal and the second terminal are disposed side by side along a longitudinal direction of the lint filter.

According to an embodiment of the disclosure, the processor is configured to control the washing device to spray the washing water toward the lint filter based on the signal produced by the sensor being in response to the first terminal and the second terminal being electrically connected by the lint that is collected in the lint filter.

According to an embodiment of the disclosure, the processor is configured to control the washing device to spray the water toward the lint filter based on the signal produced by the sensor being in response to a current flowing from the first terminal to the second terminal being greater than a preset value.

According to an embodiment of the disclosure, the washing machine with drying function further includes a water supply pipe connected with an external water supply source, wherein the washing device includes a washing pipe including a first end that is connected to the water supply pipe, and a plurality of nozzle holes formed at a lower surface of the washing pipe.

According to an embodiment of the disclosure, the washing pipe includes a second end that is closed.

According to an embodiment of the disclosure, the washing pipe includes a second end, and is disposed to be inclined downward from the first end toward the second end.

According to an embodiment of the disclosure, the washing device includes a washing valve configured to selectively open and close the first end of the washing pipe.

According to an embodiment of the disclosure, the processor is configured to control the washing device to spray the washing water toward the lint filter by controlling the washing valve to be opened.

According to an embodiment of the disclosure, the lint filter includes a mesh net to filter the lint in the airflow flowing through the back duct, and a frame which surrounds and supports the mesh net.

According to an embodiment of the disclosure, the frame includes an inner circumferential surface that supports the mesh net, and an outer circumferential surface which is fitted to an inner surface of the back duct.

According to an embodiment of the disclosure, the back duct includes a rigid area including an upper end connected to the heat exchange part, and a lower end, and a flexible area connected to the lower end of the rigid area, and configured with a bellows shape, wherein the lint filter is disposed in the flexible area.

According to an embodiment of the disclosure, the washing machine further includes a water supply pipe connected with an external water supply source, wherein the washing device includes a washing pipe including an end that is connected to the water supply pipe, and a plurality of nozzle holes formed at a lower surface of the washing pipe, wherein the washing pipe is configured to extend through the rigid area.

According to an embodiment of the disclosure, the washing device is disposed above the lint filter.

Additional embodiments of the disclosure will be set forth in part in the description which follows and, in part, will be obvious from the description, or will be apparent from the disclosure.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Descriptions below, which takes into reference the accompanying drawings, is provided to assist in a comprehensive understanding of various embodiments of the disclosure as defined by the claims and its equivalent. Although various specific details are included to assist in the understanding herein, the above are to be understood as merely example embodiments. Accordingly, it will be understood by those of ordinary skill in the art that various modifications may be made to various embodiments described herein without departing from the scope and spirit of the disclosure. In addition, descriptions on well-known functions and configurations will be omitted for clarity and conciseness.

Terms and words used in the description below and in the claims are not limited to its bibliographical meaning, and are used merely to assist in a clear and coherent understanding of the disclosure. Accordingly, the description below on the various embodiments of the disclosure are provided simply as examples and it will be clear to those of ordinary skill in the art that the example embodiments as defined by the appended claims and its equivalent are not for limiting the disclosure.

Terms such as first and second may be used in describing various elements, but the elements are not limited by the above-described terms. The above-described terms may be used only for the purpose of distinguishing one element from another element. For example, a first element may be designated as a second element, and likewise, a second element may be designated as a first element without exceeding the scope of protection.

The terms used in the embodiments of the disclosure may be interpreted to have meanings generally understood to one of ordinary skill in the art unless otherwise defined.

In addition, terms such as 'front end,' 'back end,' 'upper part,' 'lower part,' 'upper end,' 'lower end,' and the like used in the disclosure may be defined based on the drawings, and forms and locations of each element are not limited by these terms.

An embodiment addresses at least the above-mentioned problems and/or disadvantages, and provides a washing machine with drying function which can effectively wash a lint filter.

A washing machine with drying function 1 according to an embodiment will be described in detail below with reference to the accompanied drawings.

Figure 1:
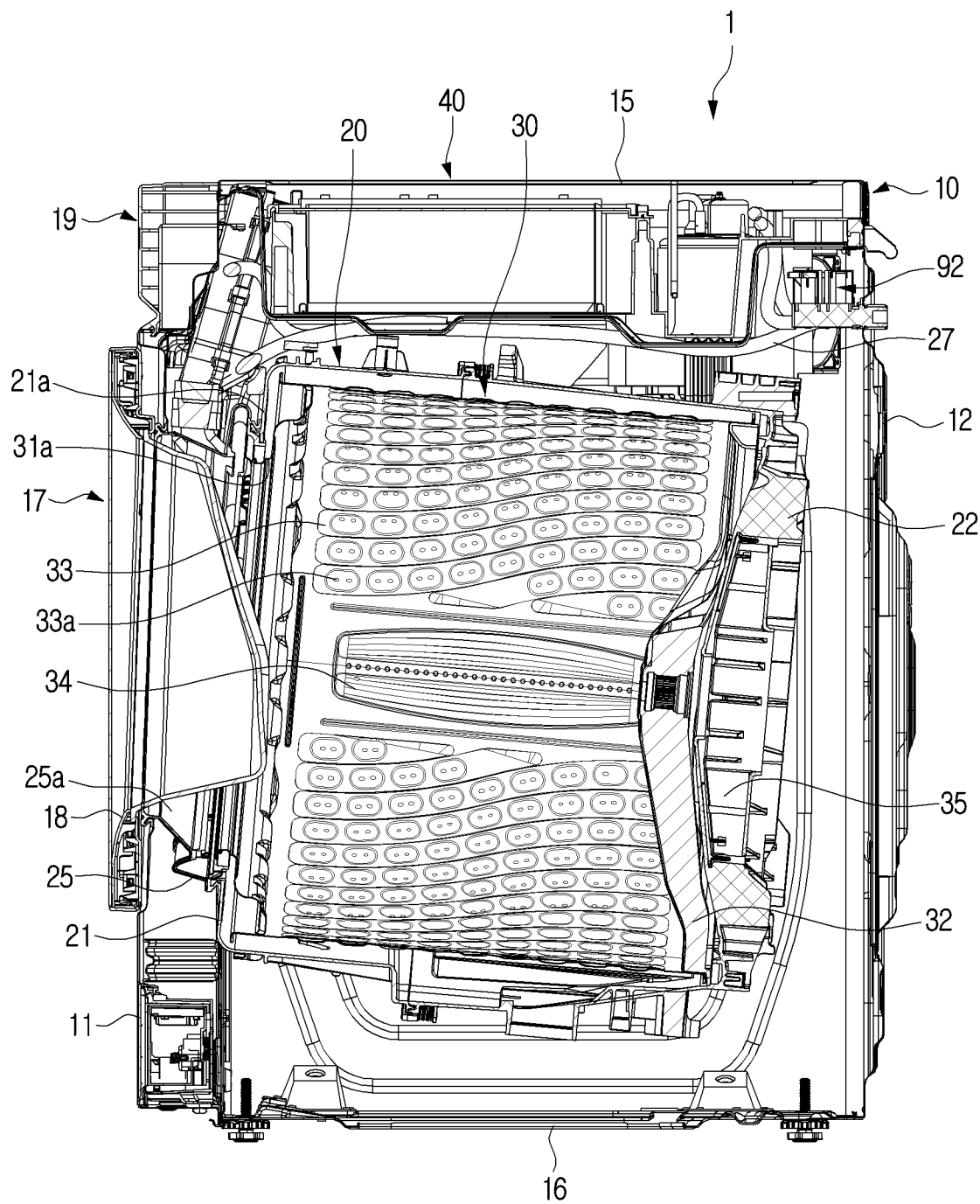
FIG. 1 is a cross-sectional view of a washing machine with drying function according to an embodiment of the disclosure.

FIG. 1 is a cross-sectional view of a washing machine with drying function according to an embodiment.

Referring to FIG. 1, the washing machine with drying function 1 according to an embodiment may include a cabinet 10, a tub 20, a drum 30, and a heated air supplying device 40.

The cabinet 10 may form an exterior of the washing machine with drying function 1, and may be formed roughly in a rectangular parallelepiped shape. The cabinet 10 may include a front surface cover 11, a back surface cover 12, a left-side cover, a right-side cover, an upper cover 15, and a lower cover 16.

At a front surface of the cabinet 10, a laundry insertion hole 18 may be provided to load and unload laundry to an inside of the cabinet 10. That is, the laundry insertion hole 18 may be formed at the front surface cover 11 of the cabinet 10.

At the laundry insertion hole 18, a door 17 may be installed so as to be openable and closeable. At an upper part of the front surface cover 11 of the cabinet 10, a control panel 19 which can control the washing machine 1 may be provided.

Figure 6:
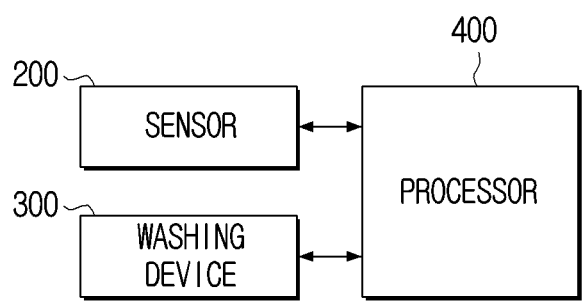
FIG. 6 is a functional block diagram illustrating a washing machine with drying function according to an embodiment of the disclosure.

The control panel 19 may include a plurality of buttons for receiving a user input, and may be formed to output an electrical signal corresponding to the received user input to a processor 400 (referring to FIG. 6).

The tub 20 may be installed at the inside of the cabinet 10, and formed in a hollow cylindrical shape on which a front opening 21a is provided toward the laundry insertion hole 18 of the front surface cover 11. The front opening 21a of the tub 20 may be formed to have a size corresponding to the laundry insertion hole 18. At a back end of the tub 20, a back surface plate 22 may be provided. At the back surface plate 22, a back opening 22a (shown in FIG. 3) through which air inside the tub 20 is discharged may be provided.

The tub 20 may contain water of a predetermined amount, that is washing water, necessary for washing. The tub 20 may be supported and fixed at an inner surface of the cabinet 10 by a tension spring, an oil damper, and the like.

Between the tub 20 and the front surface cover 11 of the cabinet 10, a diaphragm 25 may be installed. The diaphragm 25 may be formed roughly in an annular shape. One end of the diaphragm 25 may be fixed to a front surface 21 of the tub 20 at which the front opening 21a is provided, and other end of the diaphragm 25 may be fixed to an inner circumference of the laundry insertion hole 18 of the front surface cover 11 of the cabinet 10.

The diaphragm 25 may be configured such that the washing water contained in the tub 20 is not leaked to an outside of the tub 20, and may form a pathway through which the laundry passes. In addition, the diaphragm 25 may block vibration which is generated when the drum 30 is rotated from being transferred to the front surface cover 11 of the cabinet 10 through the tub 20.

The drum 30 may be installed at an inside of the tub 20 to be rotatable, and may be formed roughly in a hollow cylindrical shape. At a front surface of the drum 30, a drum opening 31a corresponding to the laundry insertion hole 18 of the cabinet 10 and the front opening 21a of the tub may be provided, and at a back end of the drum 30, a back surface plate 32 may be provided.

At a side surface 33 of the drum 30, a plurality of through-holes 33a through which the washing water can pass may be provided. The back surface plate 32 of the drum 30 may be provided with a plurality of through-holes. Accordingly, air inside the drum may be discharged to a space between the drum 30 and the tub 20 through the plurality of through-holes 33a formed at the side surface 33 of the drum 30 and the plurality of through-holes formed at the back surface plate 32.

In addition, at an inner circumferential surface of the drum 30, a plurality of lifts 34 which can raise the laundry may be provided. The drum 30 may rotate about a central axis by a driving device which includes a driving motor 35 installed at the back surface plate 32.

A water supplying device for supplying water to the tub 20 may be provided above the tub 20, and a water draining device for draining water from the tub 20 to the outside may be disposed below the tub 20.

The water supplying device may include a water supply pipe 27 connected with an external water supply source and a water supply valve 92 configured to open and close the water supply pipe 27. One end of the water supply pipe 27 may be connected to the diaphragm 25. The water supply pipe 27 may be provided with a detergent intake part. The water supply pipe 27 may be branched to connect to a washing device 300 which will be described below.

The water draining device may be formed to discharge the washing water contained in the tub 20 to the outside of the washing machine with drying function 1. The water draining device may be installed below the tub 20, and may include a water drain pump and a water drain pipe. When the water drain pump is operated, the washing water contained in the tub 20 may be discharged to the outside of the washing machine 1 through the water drain pipe.

At an upper side of the tub 20, the heated air supplying device 40 may be installed to dry the laundry which was washed by a rotation of the drum 30. The heated air supplying device 40 may be formed to generate heated air by heating and drying air discharged from the tub 20 and to circulate the heated air through the inside of the tub 20 so as to dry the laundry contained inside of the drum 30. In the description below, heated air may refer to air heated and dried by the heated air supplying device 40.

Figure 2:
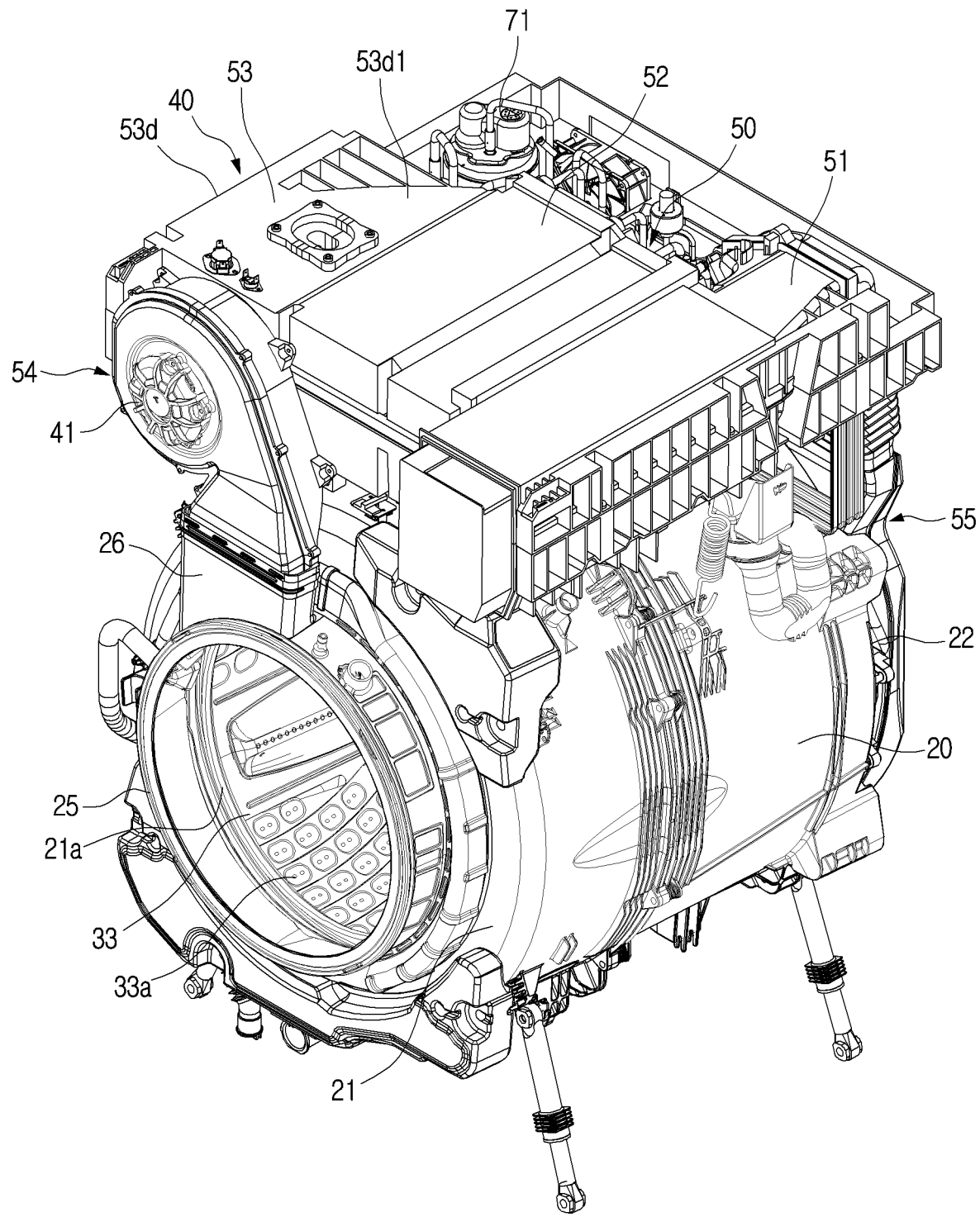
FIG. 2 is a perspective view illustrating a heated air supplying device according to an embodiment of the disclosure.
Figure 3:
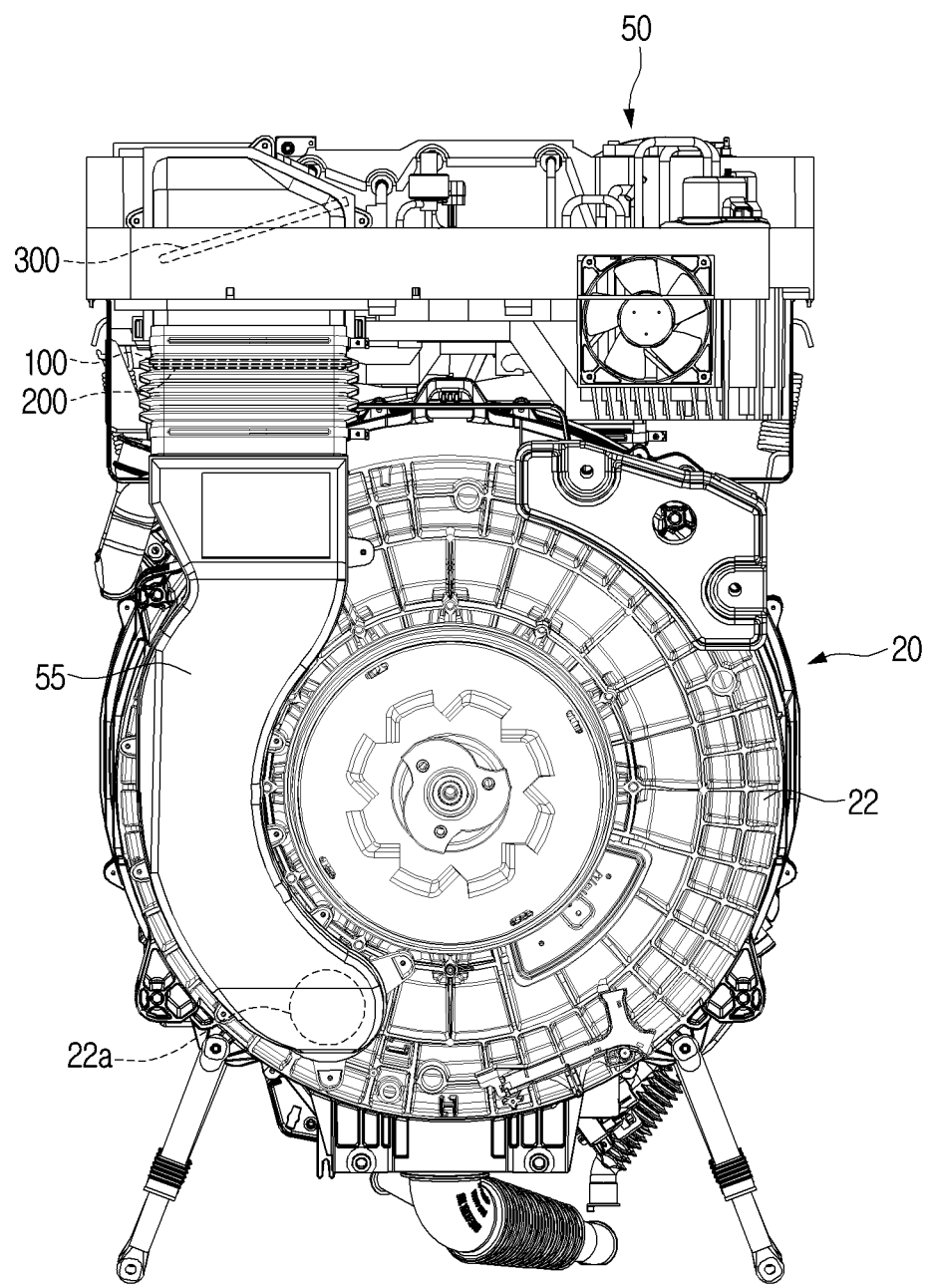
FIG. 3 is a back view illustrating a heated air supplying device according to an embodiment of the disclosure.
Figure 4:
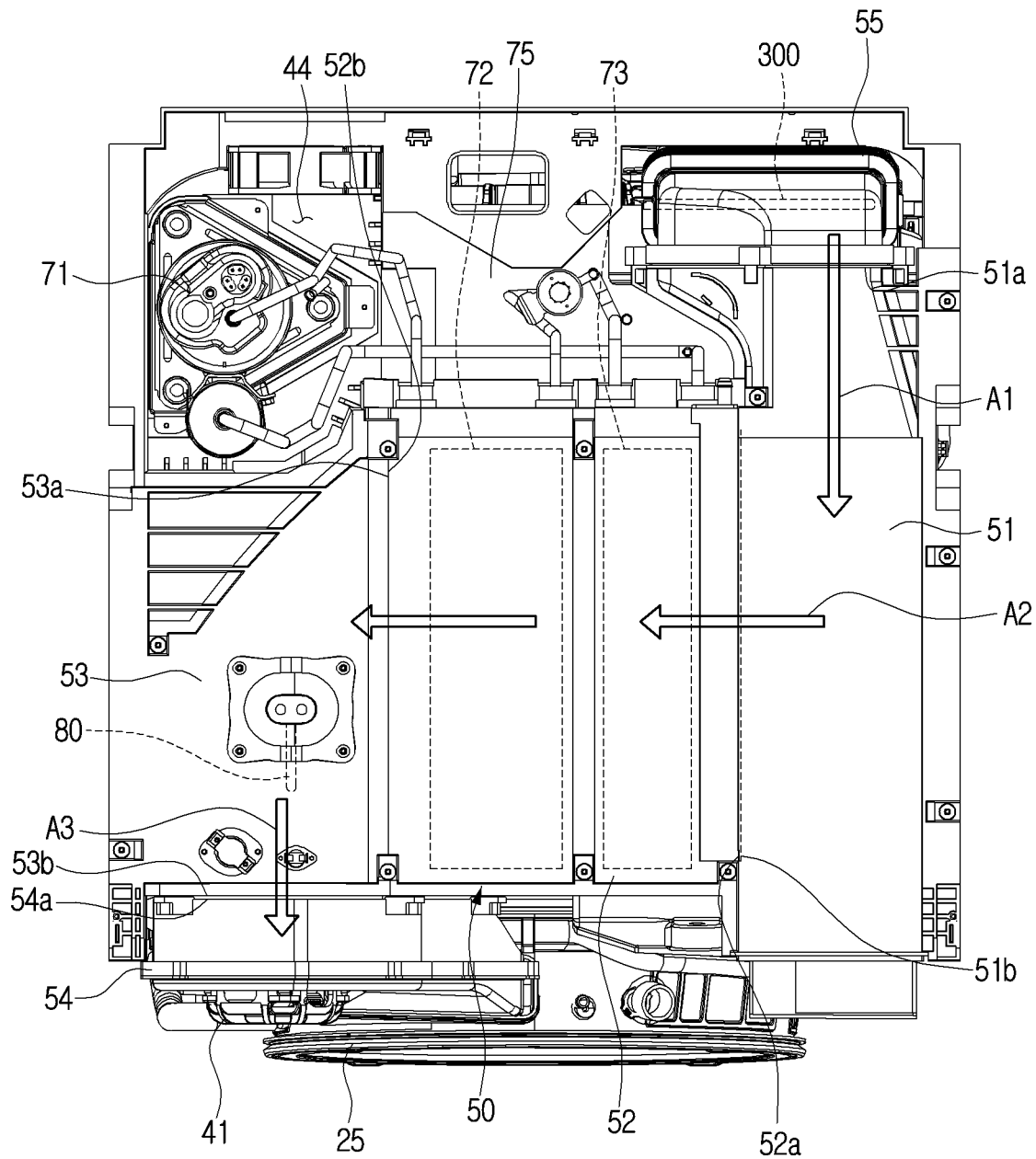
FIG. 4 is a top plan view illustrating a heated air supplying device according to an embodiment of the disclosure.
Figure 5:
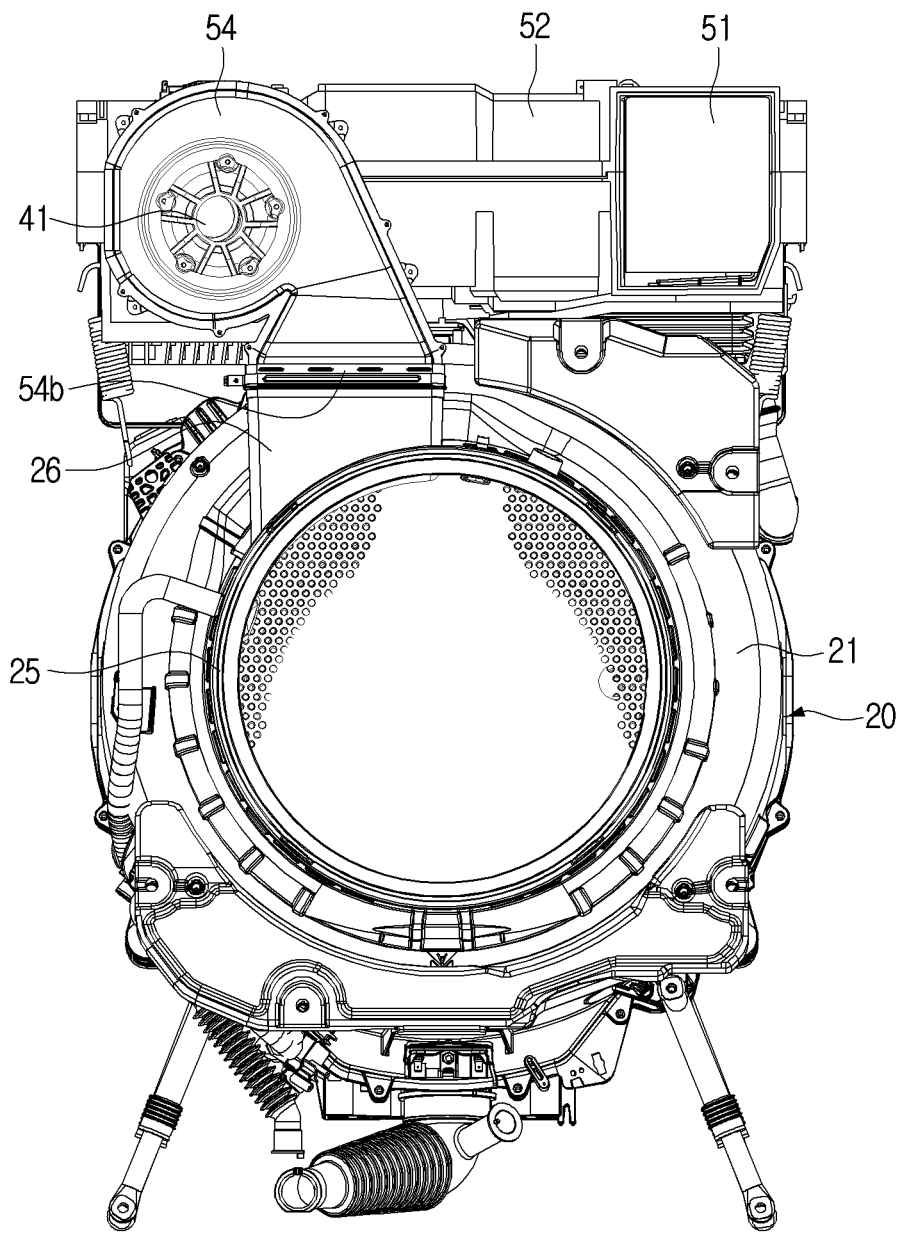
FIG. 5 is a front view illustrating a heated air supplying device according to an embodiment of the disclosure.

FIG. 2 is a perspective view illustrating a heated air supplying device according to an embodiment. FIG. 3 is a back view illustrating a heated air supplying device according to an embodiment. FIG. 4 is a top plan view illustrating a heated air supplying device according to an embodiment. FIG. 5 is a front view illustrating a heated air supplying device according to an embodiment.

Referring to FIG. 2 to FIG. 5, the heated air supplying device 40 according to an embodiment may include an upper duct 50 provided at the upper side of the tub 20, a front duct 54 provided at the front surface of the tub 20, a back duct 55 provided at a back surface of the tub 20, a blower fan 41 which circulates air, and a heat exchange part which removes moisture included in the air and heats the air.

The back duct 55 may be provided at the back surface, that is the back surface plate 22, of the tub 20, and formed to guide air being discharged from the tub 20 toward the upper side of the tub 20. At the back surface plate 22 of the tub 20, the back opening 22a through which air is discharged may be provided. An inlet of the back duct 55 may be connected with the back opening 22a of the tub 20. That is, the back duct 55 may be configured to communicate the back opening 22a with the heat exchange part of the tub 20.

An outlet of the back duct 55 may be connected with an inlet 51a of an inlet duct 51. The outlet of the back duct 55 may be formed to a size and shape corresponding to the inlet 51a of the inlet duct 51. Accordingly, air which is discharged from the back opening 22a of the tub 20 may be introduced to the inlet duct 51 through the back duct 55.

The back duct 55 may be installed to lean toward one side to the back surface plate 22 of the tub 20. Accordingly, the outlet of the back duct 55 may be provided to lean toward one side from the back surface of the tub 20.

At an inside of the back duct 55, a lint filter 100, a sensor 200, and a washing device 300 may be disposed. Detailed structures of the lint filter 100, the sensor 200, and the washing device 300 will be described below.

The upper duct 50 may be formed to connect the back duct 55 and the blower fan 41 which is installed at the front side of the tub 20. The upper duct 50 may be formed roughly in an L-shape. At a back surface of the upper duct 50, an inlet port through which air that is discharged from the tub 20 is introduced may be provided, and at a front surface of the upper duct 50, an outlet port through which air is discharged may be provided. Here, the front surface and the back surface of the upper duct 50 may respectively mean surfaces corresponding to the front surface cover 11 and the back surface cover 12 of the cabinet 10.

The upper duct 50 may be formed such that a flow of air, that is the airflow, which is introduced from the back side is bent in a right-angle direction, moved in a straight line for a certain distance, and then bent again in the right-angle direction to be discharged to the outside toward the front side of the cabinet 10. That is, the upper duct 50 may form an upper flow path which guides the airflow such that the airflow introduced from the back side is bent in a right-angle direction, moved in a straight line for a certain distance, and then bent again in the right-angle direction to be discharged to the outside toward the front side of the cabinet 10.

The upper duct 50 may be installed adjacent to the front surface 21 of the tub 20. Accordingly, a space 44 in which a compressor 71 of the heat exchange part is disposed may be provided between the back surface of the tub 20 and the upper duct 50 above the tub 20. Here, the front surface 21 of the tub 20 may refer to a surface at which the front opening 21a is formed. One side of the tub 20 may refer to a left side or a right side based on the front surface 21 of the tub 20, and the other side of the tub 20 may refer to the opposite side of the one side of the tub 20 based on the front surface 21 of the tub 20.

The inlet 51a of the upper duct 50 may be provided to be adjacent to the one side and the back surface of the tub 20. The inlet 51a of the upper duct 50 may be in communication with the outlet port of the back duct 55. Accordingly, the air that is discharged from the tub 20 may be introduced into the upper duct 50 in a direction from the back side of the tub 20 toward the front side of the tub 20.

An outlet 53b of the upper duct 50 may be provided to be adjacent to the other side and the front surface 21 of the tub 20. Accordingly, the air that is discharged from the upper duct 50 may be discharged toward the front side of the tub 20.

The inlet 51a and the outlet 53b of the upper duct 50 may be provided in a diagonal direction above the tub 20. In other words, the inlet 51a of the upper duct 50 may be provided at one side edge of the tub 20, and the outlet 53b of the upper duct 50 may be provided at other side edge of the tub 20 which is positioned at an opposite side in the diagonal direction.

At the outlet 53b of the upper duct 50, the blower fan 41 may be installed. The blower fan 41 may be contained inside a front duct 54 which connects the upper duct 50 and the tub 20. The blower fan 41 may form an airflow which flows from the back duct 55, passing the heat exchange part, toward the front duct 54.

An inlet 54a of the front duct 54 may be formed so as to suction air that is being discharged from the outlet 53b of the upper duct 50 toward the front side, and an outlet 54b of the front duct 54 may be provided to discharge the airflow toward the diaphragm 25.

The upper duct may include an inlet duct 51, a heat exchange duct 52, and a supply duct 53.

The inlet duct 51 may be provided to be adjacent to the one side of the tub 20 above the tub 20, and formed for the airflow which is discharged from the back opening 22a of the back surface plate 22 of the tub 20 to be introduced. The inlet duct 51 may be formed so that the introduced airflow flows in a straight line.

The inlet 51a of the inlet duct 51 may be connected with an outlet of the back duct 55. The inlet 51a of the inlet duct 51 may form the inlet 51a of the upper duct 50.

The inlet 51a of the inlet duct 51 may be provided at the back end of the inlet duct 51, and an outlet 51b of the inlet duct 51 may be provided at one side surface of the inlet duct 51, that is, the side surface that contacts the heat exchange duct 52. Accordingly, the outlet 51b of the inlet duct 51 may form a right-angle with the inlet 51a of the inlet duct 51.

The outlet 51b of the inlet duct 51 may be formed to be greater than the inlet 51a. For example, the outlet 51b of the inlet duct 51 may be formed to be greater by two times or more than the inlet 51a of the inlet duct 51.

The inlet duct 51 may have a rectangular cross-section, and the back end thereof may be connected to the back duct 55. That is, the inlet 51a may be provided at the back surface of the inlet duct 51. The inlet duct 51 may be installed to be adjacent to the one side of the tub 20 above the tub 20. A front surface of the inlet duct 51 may be adjacent to the front surface 21 of the tub 20, and the back surface thereof may be installed to be adjacent to the back surface plate 22 of the tub 20.

The outlet 51b may be provided at the one side surface of the inlet duct 51. The outlet 51b of the inlet duct 51 may be formed to have a shape and size that corresponds to an inlet 52a of the heat exchange duct 52.

The outlet 51b of the inlet duct 51 and the inlet 52a of the heat exchange duct 52 may be formed in a rectangular shape. The outlet 51b of the inlet duct 51 may be formed to be the same as or greater than the size of the inlet 52a of the heat exchange duct 52. A width of the outlet 51b of the inlet duct 51 may be smaller than a length of the inlet duct 51.

The airflow introduced into the inlet 51a of the inlet duct 51 may be introduced into the inlet 52a of the heat exchange duct 52 after passing the outlet 51b.

The heat exchange duct 52 may be provided at a right-angle with respect to the inlet duct 51 above the tub 20, and connected at one side of the inlet duct 51. The heat exchange duct 52 may be formed so that the introduced airflow flows in a straight line.

A width of the heat exchange duct 52 may be maximized as much as possible to maximize a heat transfer area. However, the width of the heat exchange duct 52 may be smaller than the length of the inlet duct 51. For example, the width of the heat exchange duct 52 may be formed to be greater than or equal to half of a length of the tub 20. Accordingly, a part of the inlet duct 51 may protrude from a back surface of the heat exchange duct 52 toward the back surface cover 12 of the cabinet 10.

The inlet 52a of the heat exchange duct 52 may be provided at one end of the heat exchange duct 52, and an outlet 52b of the heat exchange duct 52 may be provided at the other end of the heat exchange duct 52. That is, the inlet 52a and the outlet 52b of the heat exchange duct 52 may be provided to face each other in a straight line. The inlet 52a and the outlet 52b of the heat exchange duct 52 may be formed to be the same as the cross-section of the heat exchange duct 52.

The inlet 52a of the heat exchange duct 52 may be connected with the outlet 51b of the inlet duct 51. The outlet 51b of the inlet duct 51 may be formed to have a shape and size that corresponds to the inlet 52a of the heat exchange duct 52.

The heat exchange duct 52 may have a rectangular cross-section, and both side ends thereof may be opened. The heat exchange duct 52 may be formed to have a widest possible cross-section area so as to fully maximize the heat transfer area.

The heat exchange duct 52 may be connected at a right-angle with the inlet duct 51. That is, a center line in a length direction of the heat exchange duct 52 and a center line in a length direction of the inlet duct 51 may be connected to form a right-angle.

The heat exchange duct 52 may be installed above the tub 20 so that the front surface thereof is adjacent to the front surface 21 of the tub 20. The back surface of the heat exchange duct 52 may be spaced apart by a certain distance from the back surface of the tub 20.

At an inside of the heat exchange duct 52, an evaporator 73 and a condenser 72 may be installed. Accordingly, the airflow that flows through the heat exchange duct 52 may sequentially pass the evaporator 73 and the condenser 72.

The supply duct 53 may be provided to be adjacent to the other side of the tub 20 above the tub 20, and formed to discharge the airflow introduced from the heat exchange duct 52 to the blower fan 41. The supply duct 53 may be connected with the heat exchange duct 52 at a right-angle. The supply duct 53 may be formed for the inlet airflow to flow in a straight line.

An inlet 53a of the supply duct 53 may be connected with the outlet 52b of the heat exchange duct 52. The inlet 53a of the supply duct 53 may be provided at one side surface of the supply duct 53, that is, a side surface which contacts the heat exchange duct 52. The inlet 53a of the supply duct 53 may be formed to have a shape and size that corresponds to the outlet 52b of the heat exchange duct 52.

An outlet 53b of the supply duct 53 may be formed at a front surface of the supply duct 53, and provided at a right-angle with the inlet 53a of the supply duct 53. The outlet 53b of the supply duct 53 may be connected with a suction hole of the blower fan 41, that is, the inlet 54a of the front duct 54. The outlet 53b of the supply duct 53 may form the outlet 53b of the upper duct 50.

The outlet 53b of the supply duct 53 may be formed to discharge air toward the front side of the tub 20. Accordingly, the air may be discharged from the outlet 53b of the supply duct 53 in a direction that is roughly perpendicular to the front surface of the cabinet 10.

For example, the outlet 53b of the supply duct 53 and the suction hole of the blower fan 41 which is installed at the front side of the tub 20, that is, the inlet 54a of the front duct 54, may be formed for the airflow that is discharged from the outlet 53b of the supply duct 53 to be suctioned into the blower fan 41 in a straight line.

The supply duct 53 may have a rectangular cross-section, and a front end thereof may be connected with the blower fan 41. That is, the outlet 53b may be provided at the front end of the supply duct 53. The outlet 53b of the supply duct 53 may be formed to have a shape and size that corresponds with the suction hole of the blower fan 41.

The supply duct 53 may be installed to be adjacent to the other side of the tub 20 above the tub 20. The front surface of the supply duct 53 may be adjacent to the front surface 21 of the tub 20, and the back surface thereof may be installed to be spaced apart at a certain distance from the back surface of the tub 20.

The supply duct 53 may be connected at a right-angle with the heat exchange duct 52. That is, the center line in the length direction of the heat exchange duct 52 and a center line in a length direction of the supply duct 53 form a right-angle.

The inlet 53a may be provided at the one side surface of the supply duct 53. The inlet 53a of the supply duct 53 may be formed to have a shape and size that corresponds to the outlet 52b of the heat exchange duct 52. For example, the inlet 53a of the supply duct 53 and the outlet 52b of the heat exchange duct 52 may be formed in a rectangular shape. The supply duct 53 may be formed to have a length that is roughly the same as the width of the heat exchange duct 52.

The back surface and other side surface 53d of the supply duct 53 may be connected by an inclined surface 53d1. Based on the above, the airflow introduced into the inlet 53a of the supply duct 53 may collide with the inclined surface 53d1 and be discharged through the outlet 53b of the supply duct 53. When the inclined surface 53d1 is installed at the supply duct 53 as described above, the airflow introduced into the supply duct 53 may be effectively guided to the outlet 53b. In another example, the inclined surface 53d1 of the supply duct 53 may be formed as a curved surface which can guide the airflow introduced into the inlet 53a to the outlet 53b.

At an inside of the supply duct 53, a heater 80 may be installed. The heater 80 may be formed to heat the air that passes through the supply duct 53.

The front surface of the inlet duct 51, a front surface of the heat exchange duct 52, and the front surface of the supply duct 53 may be positioned on roughly a same plane. In addition, between the one side surface of the inlet duct 51, the back surface of the heat exchange duct 52, a back surface of the supply duct 53, and the back surface of the tub 20, the space 44 may be formed. In the space 44, the compressor 71, an expansion valve, and a refrigerant pipe 75 may be installed.

The blower fan 41 may be formed to form a flow of air, that is, an airflow so that the air that is discharged from the supply duct 53 may be supplied to the front opening 21a of the tub 20.

The blower fan 41 may be installed at the front surface 21 of the tub 20. The blower fan 41 may be formed for the airflow to be introduced into the back surface thereof and discharged through a lower surface thereof. That is, the blower fan 41 may be formed for a discharge direction of the airflow to roughly form 90 degrees with an inlet direction of the airflow. Accordingly, when the blower fan 41 is operated, the air which is discharged from the outlet 53b of the supply duct 53 toward the front side of the tub 20 may be introduced into the blower fan 41, and the air may be discharged downwards from the blower fan 41 toward the diaphragm 25.

The blower fan 41 may be contained at an inside of the front duct 54. The front duct 54 may be installed at the front surface 21 of the tub 20, and connect the supply duct 53 and the diaphragm 25. Accordingly, the air that is discharged from the supply duct 53 may be supplied to an inside of the diaphragm 25 through the front duct 54.

The front duct 54 may be formed for the airflow that is discharged from the blower fan 41 to be supplied to the diaphragm 25 positioned below. The front duct 54 may be formed for the airflow that is formed by the blower fan 41 to be supplied in a straight line to the inside of the diaphragm 25.

The inlet 54a of the front duct 54 may be provided at the back surface thereof, and form the suction hole of the blower fan 41. The inlet 54a of the front duct 54 may be connected with the outlet 53b of the supply duct 53. The inlet 54a of the front duct 54 and the outlet 53b of the supply duct 53 may be positioned in a straight line. That is, the inlet 54a of the front duct 54 may be directly connected to the outlet 53b of the supply duct 53.

The front duct 54 may communicate a back opening 22a of the tub 20 with the heat exchange part. That is, the outlet 54b of the front duct 54 may be provided at a lower surface of the front duct 54, and connected with an inlet port 25a of the diaphragm 25. The outlet 54b of the front duct 54 and the inlet port 25a of the diaphragm 25 may be positioned in a straight line. That is, the outlet 54b of the front duct 54 may be directly connected to the inlet port 25a of the diaphragm 25.

At an upper part of the diaphragm 25, a connecting part 26 to which the front duct 54 is connected may be provided. The connecting part 26 may be formed to have a shape and size that corresponds to the lower surface of the front duct 54, and the inlet port 25a corresponding to the outlet 54b of the front duct 54 may be provided inside thereof.

Accordingly, the airflow that is discharged by the blower fan 41 may be introduced into the inside of the diaphragm 25, that is, the inside of the drum 30, in a straight line through the front duct 54 and the connecting part 26.

As the blower fan 41, a sirocco blower fan may be used.

When the blower fan 41 rotates, the air may be suctioned into the inlet of the front duct 54 and then discharged through the outlet 54b provided on the lower surface of the front duct 54. Accordingly, the direction of the airflow discharged from the outlet 54b of the front duct 54 may roughly form 90 degrees with the direction of the airflow which is suctioned into the inlet 54a of the front duct 54.

The heat exchange part may be formed to remove moisture from the air that passes the heat exchange duct 52 and heat the air, thereby generating dried air in high temperature. The heat exchange part may be formed as a heat pump.

The heat exchange part may include the compressor 71, the evaporator 73, the condenser 72, and the expansion valve. In addition, the heat exchange part may include the refrigerant pipe 75 through which the refrigerant circulates by connecting the compressor 71, the evaporator 73, the condenser 72, and the expansion valve.

The heat exchange part may be formed to remove the moisture contained in the air and heat the air through heat exchange between the refrigerant and the air while the refrigerant circulates through the condenser 72, the expansion valve, and the evaporator 73 by the compressor 71.

The evaporator 73 and the condenser 72 may be installed at the heat exchange duct 52. The evaporator 73 and the condenser 72 may be installed at an inside of the heat exchange duct 52 to be spaced apart at a certain distance, and the condenser 72 may be installed downstream of the evaporator 73 in a circulating direction of the airflow.

The evaporator 73 may be installed to be adjacent to the inlet duct 51, and may remove the moisture by cooling humid air that is discharged from the tub 20.

The condenser 72 may be installed to be adjacent to the supply duct 53, and may heat the air that passed the evaporator 73. Accordingly, the dried air having a high temperature may be discharged into the diaphragm 25 by the blower fan 41.

The compressor 71 may be installed at an outer side of the upper duct 50, that is, the supply duct 53 above the tub 20. That is, the compressor 71 may be installed in the space 44 between the supply duct 53 and the back surface of the tub 20. A refrigerant pipe 75 may be installed in the space 44 that is formed by the inlet duct 51, the heat exchange duct 52, the supply duct 53, and the back surface of the tub 20 above the tub 20.

The back duct 55, the inlet duct 51, the heat exchange duct 52, the supply duct 53, and the front duct 54 may respectively form a back flow path, an inlet flow path, a heat exchange flow path, a supply flow path, and a front flow path.

For example, an inner space of the inlet duct 51 may form the inlet flow path, an inner space of the heat exchange duct 52 may form the heat exchange flow path, and an inner space of the supply duct 53 may form the supply flow path. In addition, an inner space of the back duct 55 may form the back flow path, and an inner space of the front duct 54 may form a front flow path.

The inlet flow path, the heat exchange flow path, and the supply flow path may form an upper flow path which is provided at the upper side of the tub 20. Accordingly, the tub 20, the back flow path which is provided at the back surface of the tub 20, the upper flow path which is provided at the upper side of the tub 20, and the front flow path which is provided at the front surface of the tub 20 may form a circulating flow path.

Accordingly, when the blower fan 41 which is disposed in the blow flow path is operated, the air inside the drum 30 may circulate along the circulating flow path.

A drying cycle of the washing machine with drying function 1 according to an embodiment having the structure as described above will be described in detail below.

The washing machine with drying function 1 according to an embodiment may perform a washing cycle, a rinsing cycle, a spin drying cycle, and the like in the same manner as a washing machine of the related art. Accordingly, descriptions thereof will be omitted.

If the drying cycle is started, the blower fan 41 and the compressor 71 of a heat exchange part 70 may be operated.

When the compressor 71 is operated, the refrigerant may circulate between the compressor 71, the condenser 72, the expansion valve, and the evaporator 73. At this time, the evaporator 73 and the condenser 72 may be installed at the heat exchange duct 52, and the condenser 72 may be installed downstream of the evaporator 73 in the circulating direction of air.

When the blower fan 41 is operated, the air inside of the drum 30 may circulate through the back duct 55, the inlet duct 51, the heat exchange duct 52, a discharge duct 53, the blower fan 41, and the front duct 54, and the laundry may be dried.

Specifically, the humid air of the drum 30 may be discharged to a space between a back surface plate 32 of the drum 30 and the back surface plate 22 of the tub 20 through a plurality of through-holes at the back surface plate 32 of the drum 30. The humid air that is discharged between the back surface plate 32 of the drum 30 and the back surface plate 22 of the tub 20 may be introduced to the back duct 55 through the back opening 22a of the tub 20.

The humid air introduced to the back duct 55 may be discharged to the inlet duct 51 through the outlet of the back duct 55.

Air A1 introduced to the inlet Ma of the inlet duct 51 may flow in a direction perpendicular to the front surface cover 11 of the cabinet 10, that is, the front surface 21 of the tub 20. The air introduced to the inlet duct 51 may be discharged to the heat exchange duct 52.

The air introduced to the inlet 52a of the heat exchange duct 52 may flow in a direction parallel to the front surface cover 11 of the cabinet 10. That is, air A2 that flows through the heat exchange duct 52 may form a right-angle with air A1 that flows through the inlet duct 51.

The air introduced to the inlet 52a of the heat exchange duct 52 may be removed of moisture as the air passes the evaporator 73. The air removed of moisture by the evaporator 73 may be heated as it passes the condenser 72. Accordingly, at the outlet 52b of the heat exchange duct 52, the dried air having a high temperature may be discharged to the supply duct 53.

The air introduced to the inlet 53a of the supply duct 53 and heated by the condenser 72 may flow in a direction perpendicular to the front surface cover 11 of the cabinet 10. That is, air A3 that flows through the supply duct 53 may form a right-angle with the air A2 that flows through the heat exchange duct 52, and may be formed to be in parallel with the air A1 that flows through the inlet duct 51.

The air that is discharged from the outlet 53b of the supply duct 53 may be introduced into the suction hole of the blower fan 41, that is, the inlet 54a of a front duct 54. At this time, because the outlet 53b of the supply duct 53 and the inlet 54a of the front duct 54 are disposed in a straight line, a flow resistance of air that is introduced into the blower fan 41 may be minimized.

The front duct 54 may discharge the dried air having a high temperature suctioned into the inlet 54a downward to the diaphragm 25 through the outlet 54b. At this time, the direction of air that is discharged from the outlet 54b of the front duct 54 may form a right-angle with the direction of air that is suctioned into the inlet 54a.

The dried air having a high temperature, that is, heated air from the outlet 54b of the front duct 54, may be introduced into the inside of the diaphragm 25 through the connecting part 26. At this time, because the outlet 54b of the front duct 54 and the connecting part 26 are disposed in a straight line, the heated air that is discharged by the blower fan 41 may be introduced into the inside of the diaphragm 25 in a straight line.

Because the diaphragm 25 is in communication with the drum opening 31a provided at a front surface 31 of the drum 30, the heated air may be introduced into the inside of the drum 30 through the diaphragm 25.

The heated air introduced into the inside of the drum 30 may dry the laundry by contacting the laundry. The heated air, that is, dried air having a high temperature, may become humid air in low temperature due to the drying of the laundry.

The humid air in the drum 30 may continue the above-described circulation by being discharged to the back duct 55 through the plurality of through-holes of the back surface plate 32 of the drum 30.

Figure 7:
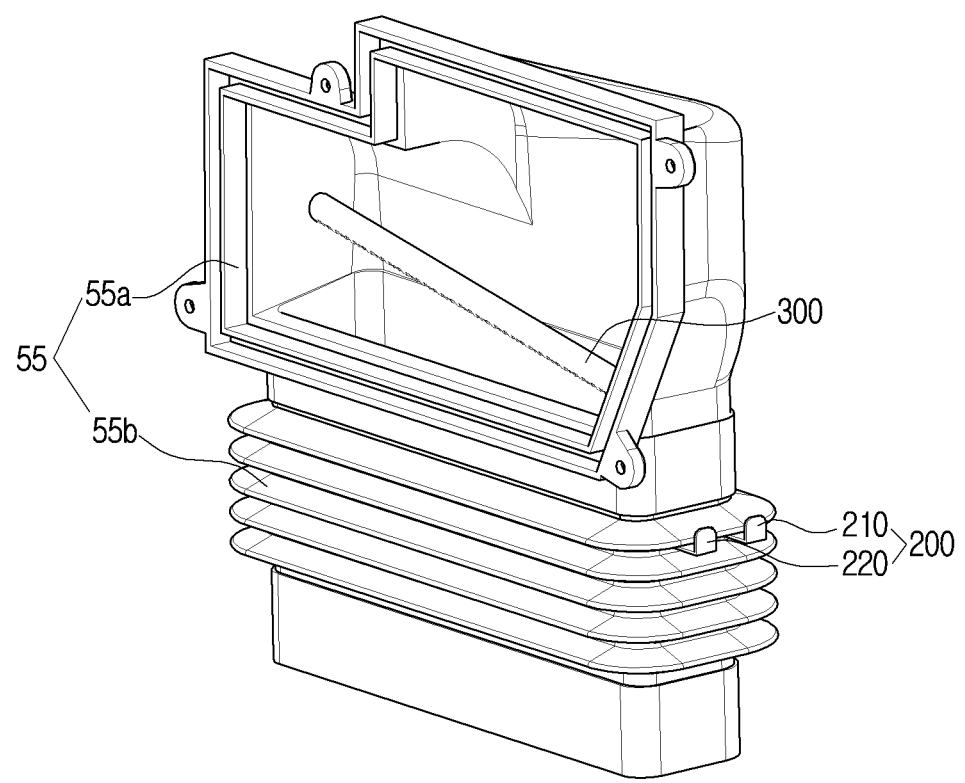
FIG. 7 is a perspective view illustrating a back duct according to an embodiment of the disclosure.
Figure 8:
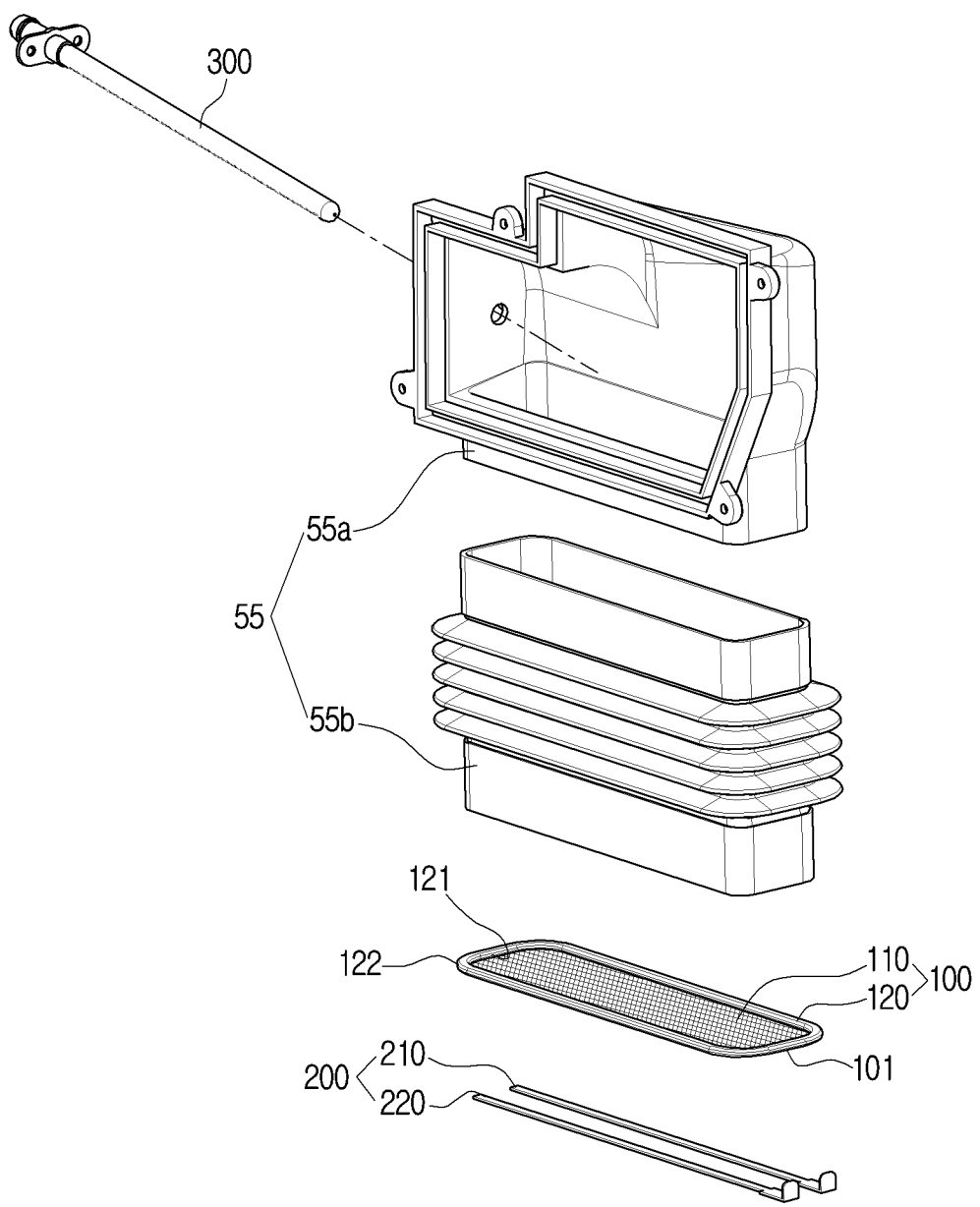
FIG. 8 is an exploded perspective view illustrating a back duct according to an embodiment of the disclosure.
Figure 9:
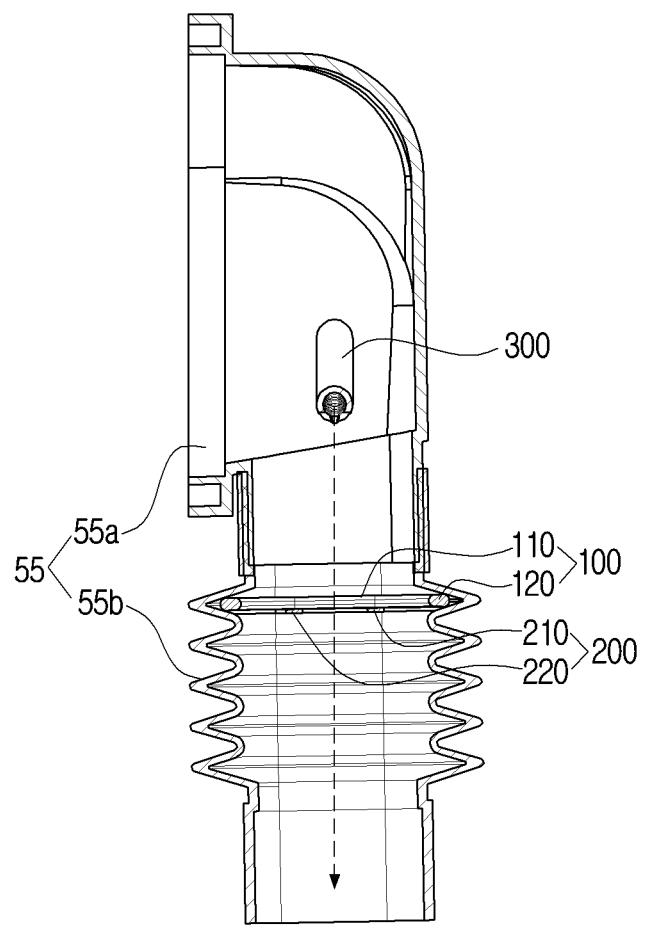
FIG. 9 is a cross-sectional view illustrating a back duct according to an embodiment of the disclosure.
Figure 10:
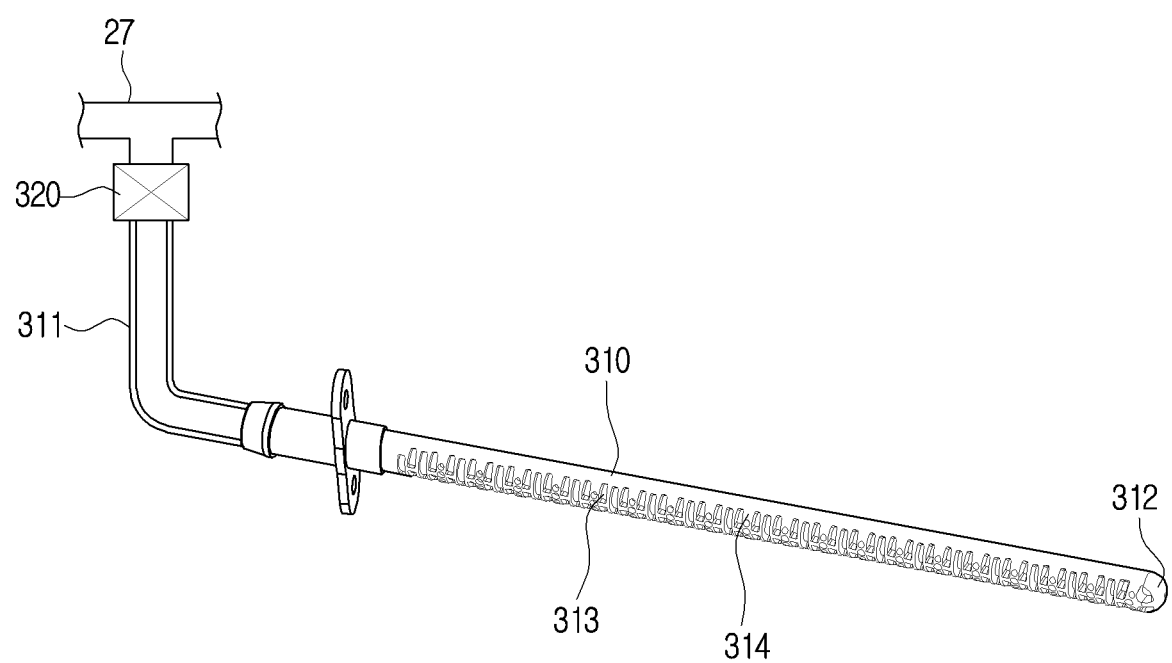
FIG. 10 is a perspective view illustrating a washing device according to an embodiment of the disclosure.

FIG. 6 is a functional block diagram illustrating a washing machine with drying function according to an embodiment. FIG. 7 is a perspective view illustrating a back duct according to an embodiment. FIG. 8 is an exploded perspective view illustrating a back duct according to an embodiment. FIG. 9 is a cross-sectional view illustrating a back duct according to an embodiment. FIG. 10 is a perspective view illustrating a washing device according to an embodiment.

Referring to FIG. 6 to FIG. 10, the washing machine with drying function 1 according to an embodiment may include a lint filter 100, a sensor 200, a washing device 300, and a processor 400.

The lint filter 100 may be disposed at the inside of the back duct 55, and may filter lint included in the air which passes the back duct 55. The lint filter 100 may have a cross-section area which corresponds with the back duct 55. The lint filter 100 may be fitted in the inner surface of the back duct 55.

The lint filter 100 may be disposed to be horizontal, and disposed to filter the vertical the airflow that rises within the back duct 55. As the drying cycle is carried out, lint may be accumulated at a lower surface 101 of the lint filter 100.

The sensor 200 may be fixed to the lint filter 100 and sense filtered lint in the lint filter 100. The sensor 200 may be disposed at the lower surface 101 of the lint filter 100, and sense the accumulated lint at the lower surface 101 of the lint filter 100.

The washing device 300 may be disposed at an upper side of the lint filter 100, and selectively spray washing water toward the lint filter 100.

The processor 400 may control, based on identifying that lint is collected in the lint filter 100 based on a signal received from the sensor 200, the washing device 300 for the washing water to be sprayed toward the lint filter 100.

A washing machine with drying function of the related art has problems of a user having to inconveniently change a lint filter to wash the lint filter, the washing water being unnecessarily used because it could not sense whether or not lint is collected in the lint filter, or drying performance being deteriorated as the lint filter is blocked according to excessive accumulation of lint collected in the lint filter.

The washing machine with drying function 1 according to an embodiment may solve the above-described problems as the lint filter 100 is cleaned by the sensor 200 sensing the accumulation of lint collected in the lint filter 100, and the washing device 300 automatically spraying the washing water toward the lint filter 100.

That is, the washing machine with drying function 1 according to an embodiment may more actively remove the lint collected in the lint filter 100, and have an effect of the drying function being maintained even if the user does not directly change the lint filter 100 or remove the lint collected in the lint filter 100.

The sensor 200 may be a touch sensor which transmits a signal indicating lint accumulation to the processor 400 when in contact with lint. The sensor 200 may be disposed as two terminals spaced apart with one another, and may include a first terminal 210 and a second terminal 220 which are electrically connectable by the lint collected in the lint filter 100 selectively.

Because lint contain moisture, the first and second terminals 210 and 220 may be electrically connected with each other. That is, when the lint is spread at the lower surface 101 of the lint filter 100 and connects the first terminal 210 with the second terminal 220, the sensor 200 may transmit the signal for lint accumulation to the processor 400.

The processor 400 may identify, based on the first terminal 210 and the second terminal 220 being electrically connected by lint, that the lint is collected in the lint filter 100.

The first terminal 210 and the second terminal 220 may be disposed side by side along a length direction of the lint filter 100. The first and second terminals 210 and 220 may be disposed symmetrically based on a center of the lint filter 100. A cross-section of the lint filter 100 may have a rectangular shape, and the first and second terminals 210 and 220 may be disposed along a diagonal direction of the lint filter 100. The first and second terminals 210 and 220 may be disposed diagonally based on the center of the lint filter 100.

Accordingly, the first and second terminals 210 and 220 may cover most of the area from among the lower surface 101 of the lint filter 100. Even if lint is collected at only some areas of the lint filter 100, the sensor 200 may easily sense whether there is the accumulation of lint.

The processor 400 may identify, based on a current greater than a preset value flowing from the first terminal 210 to the second terminal 220, that the lint is collected in the lint filter 100.

An amount of lint which connects the first terminal 210 and the second terminal 220 and current which flows from the first terminal 210 to the second terminal 220 may be proportional. That is, as more lint is accumulated in the lint filter 100, more current may flow from the first terminal 210 to the second terminal 220.

Accordingly, the processor 400 may wash, based on identifying that much lint is sufficiently accumulated in the lint filter 100, the lint filter 100 by controlling the washing device 300.

The lint filter 100 may include a mesh net 110 through which lint is filtered and a frame 120 which surrounds and supports the mesh net 110. The mesh net 110 may have a net shape, include a plurality of through-holes, pass only air from among the air which includes lint, and filter the lint.

The frame 120 of the lint filter 100 may include an inner circumferential surface 121 which supports the mesh net 110 and an outer circumferential surface 122 which is fitted at an inside surface of the back duct 55. Accordingly, the mesh net 110 may be stably supported by the frame 120, and the frame 120 may be stably supported by the back duct 55.

The back duct 55 may include a rigid area 55a which includes a front end that connects to the heat exchange part and a flexible area 55b which connects to a lower end of the rigid area 55a and is of a bellows shape.

Even if the tub 20 vibrates up and down or left and right, the flexible area 55b may absorb vibration of the tub 20 as the flexible area 55b is extended or compressed in an upward and downward direction, and prevent the rigid area 55a which is rigid and the tub 20 from being damaged.

The lint filter 100 may be disposed in the flexible area 55b. The lint filter 100 may be fitted inside of the flexible area 55b.

The washing machine with drying function 1 according to an embodiment may further include a water supply pipe 27 connected with an external water supply source. In addition, the washing device 300 may include a washing pipe 310 which includes a first end 311 that connects to the water supply pipe 27 and a plurality of nozzle holes 313 that is formed at a lower surface 314.

The washing pipe 310 may have a hollow cylindrical shape, and washing water may flow inside thereof. The washing water may flow along a length direction of the washing pipe 310, and then arrive at the lint filter 100 by being dropped downward through the nozzle holes 313.

A second end 312 of the washing pipe 310 may be formed to be closed. Accordingly, the washing water introduced to the first end 311 of the washing pipe 310 may all fall toward the lint filter 100.

The washing pipe 310 may be disposed to be inclined downward from the first end 311 toward the second end 312. The washing water introduced to the first end 311 of the washing pipe 310 may have a speed in a length direction of the washing pipe 310. That is, the washing water that flows along the downward inclined washing pipe 310 may have a speed in a downward direction.

Accordingly, the washing water that falls through the nozzle holes 313 of the washing pipe 310 may fall in a vertical downward direction without falling at a slant. The lint may not be adhered to the inner surface of the back duct 55, and fall in a vertical downward direction from the lint filter 100.

The washing pipe 310 may pass through the rigid area 55a of the back duct 55. The second end 312 of the washing pipe 310 may be floated in air. The washing pipe 310 may be stably supported by the rigid area 55a.

The washing device 300 may include a washing valve 320 configured to selectively open and close the first end 311 of the washing pipe 310. The processor 400 may control, based on identifying that the lint is collected in the lint filter 100 based on a signal received from the sensor 200, the washing valve 320 to open the first end 311 of the washing pipe 310.

When the first end 311 of the washing pipe 310 is opened, the washing water flows from the water supply pipe 27 to the inside of the washing pipe 310 through the washing valve 320, and then the washing water which passed the nozzle holes 313 may wash the lint filter 100.

The washing machine with drying function 1 according to an embodiment of the disclosure as described above may solve the above-described problems as the lint filter 100 is cleaned based on the sensor 200 detecting the accumulation of lint collected in the lint filter 100 and the washing device 300 automatically spraying the washing water toward the lint filter 100.

That is, the washing machine with drying function 1 according to an embodiment may have an effect in drying performance being maintained without the user having to directly change the lint filter 100 or remove the lint collected in the lint filter 100 by more actively removing the lint collected in the lint filter 100.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A washing machine with drying function, comprising:
    a cabinet having a laundry insertion hole at a front surface of the cabinet;
    a tub inside the cabinet and having a front opening and a back opening;
    a drum rotatably disposed inside the tub, wherein the laundry insertion hole, the front opening, and the drum are positioned so that laundry is insertable through the laundry insertion hole and then through the front opening to be received in the drum;
    a heated air supplying device including:
        a heat exchange part above the tub,
        a front duct,
        a back duct, and
        a blower fan to form an airflow that flows, via the back duct and the front duct, from the back opening to the heat exchange part, and then to the front opening;
    a lint filter inside the back duct, and configured to filter lint in the airflow flowing through the back duct;
    a sensor fixed to the lint filter and configured to detect lint in the lint filter, and to produce a corresponding signal;
    a washing device configured to selectively spray washing water toward the lint filter; and
    a processor configured to control the washing device to spray the washing water toward the lint filter based on the signal produced by the sensor.

2. The washing machine with drying function of claim 1, wherein the sensor is disposed at a lower surface of the lint filter.

3. The washing machine with drying function of claim 1, wherein
    the sensor includes:
        a first terminal, and
        a second terminal,
            wherein the first terminal and the second terminal are spaced apart from each other, and
            the first terminal and the second terminal are electrically connectable by lint collected in the lint filter.

4. The washing machine with drying function of claim 3, wherein the first terminal and the second terminal are disposed side by side along a longitudinal direction of the lint filter.

5. The washing machine with drying function of claim 3, wherein the processor is configured to control the washing device to spray the washing water toward the lint filter based on the signal produced by the sensor being in response to the first terminal and the second terminal being electrically connected by the lint that is collected in the lint filter.

6. The washing machine with drying function of claim 5, wherein the processor is configured to control the washing device to spray the water toward the lint filter based on the signal produced by the sensor being in response to a current flowing from the first terminal to the second terminal being greater than a preset value.

7. The washing machine with drying function of claim 1, further comprising:
    a water supply pipe connected with an external water supply source,
    wherein the washing device includes:
        a washing pipe including a first end that is connected to the water supply pipe, and a plurality of nozzle holes formed at a lower surface of the washing pipe.

8. The washing machine with drying function of claim 7, wherein the washing pipe includes a second end that is closed.

9. The washing machine with drying function of claim 7, wherein the washing pipe includes a second end, and is disposed to be inclined downward from the first end toward the second end.

10. The washing machine with drying function of claim 7, wherein the washing device includes a washing valve configured to selectively open and close the first end of the washing pipe.

11. The washing machine with drying function of claim 10, wherein the processor is configured to control the washing device to spray the washing water toward the lint filter by controlling the washing valve to be opened.

12. The washing machine with drying function of claim 1, wherein the lint filter includes:
a mesh net to filter the lint in the airflow flowing through the back duct, and
a frame which surrounds and supports the mesh net.

13. The washing machine with drying function of claim 12, wherein the frame includes:
an inner circumferential surface that supports the mesh net, and
an outer circumferential surface which is fitted to an inner surface of the back duct.

14. The washing machine with drying function of claim 1, wherein the back duct includes:
a rigid area including an upper end connected to the heat exchange part, and a lower end, and
a flexible area connected to the lower end of the rigid area, and configured with a bellows shape,
wherein the lint filter is disposed in the flexible area.

15. The washing machine with drying function of claim 14, further comprising:

a water supply pipe connected with an external water supply source,
wherein the washing device includes:
a washing pipe including an end that is connected to the water supply pipe, and
a plurality of nozzle holes formed at a lower surface of the washing pipe,
wherein the washing pipe is configured to extend through the rigid area.

16. The washing machine with drying function of claim 1, wherein the washing device is disposed above the lint filter.

* * * * *